United States Patent
McGowan et al.

[11] Patent Number: 5,937,345
[45] Date of Patent: Aug. 10, 1999

[54] METHOD AND APPARATUS FOR INTERCEPTING CALLS IN A COMMUNICATIONS SYSTEM

[75] Inventors: Rosemary McGowan, Richardson; Robert Dale Dover, Allen, both of Tex.; Kathryn Dobson Kerber, Atlantic Beach, Fla.

[73] Assignee: Nortel Networks Corporation, Montreal, Canada

[21] Appl. No.: 08/850,524

[22] Filed: May 2, 1997

[51] Int. Cl.⁶ ......................................................... H04Q 7/34
[52] U.S. Cl. ........................... 455/410; 455/410; 455/414; 455/411; 455/461
[58] Field of Search ..................................... 455/410, 411, 455/414, 423, 424, 425, 517, 560, 405, 412, 432, 434, 456, 457, 461; 379/35

[56] References Cited

U.S. PATENT DOCUMENTS

| | | | |
|---|---|---|---|
| 5,428,667 | 6/1995 | Easterling et al. | 455/410 |
| 5,633,928 | 5/1997 | Lenstra et al. | 380/21 |
| 5,710,971 | 1/1998 | Armbruster et al. | 455/12.1 |
| 5,790,638 | 8/1998 | Bertacchi | 379/88.6 |
| 5,794,140 | 8/1998 | Sawyer | 455/408 |

*Primary Examiner*—Wellington Chin
*Assistant Examiner*—Yemane Woldetatios
*Attorney, Agent, or Firm*—John D. Crane; Daniel E. Venglarik; Andrew J. Dillon

[57] ABSTRACT

A method and apparatus for intercepting calls within a wireless communications system. In particular, the present invention provides a call intercept component and a number of control points. Each of the control points is associated with a layer or component within the wireless communications system that handles messages associated with a mobile station within the wireless communications system. Each control point monitors messages received at the component or layer associated with the control point. The messages are examined to determine whether the message is appropriate for interception. If the message is appropriate for interception, the message is then sent the call interception layer. In turn, the call interception layer formats data from the message and routes it to a destination.

54 Claims, 10 Drawing Sheets

| 800 |
|---|
| Mobile Originated Calls (voice, data, fax, etc.) |
| Mobile Terminated Calls (voice, data, fax, etc.) |
| Mobile Originated Short Message Service Calls |
| Mobile Terminated Short Message Service Calls |
| Call Related Supplementary Services (Call waiting, Multi-party, etc.) |
| Non-Call Related Supplementary Services (Registration of Call Forwarding, etc.) |
| Location Updates |
| Attach, Detach (Power-Up and Power-Down) |
| Handovers (both Intra-MSC and Inter-MSC) |
| In-Call Information such as DTMF Digits |

METHOD AND APPARATUS FOR INTERCEPTING CALLS IN A COMMUNICATIONS SYSTEM

BACKGROUND OF THE INVENTION

1. Technical Field

The present invention relates generally to a communications system and in particular to a method and apparatus for routing data within the communications system. Still more particularly, the present invention relates to a method and apparatus for intercepting calls in a communications system.

2. Description of the Related Art

Many of the present digital telecommunications networks of the world are based on time-division multiple access (TDMA) and use transmission and switching products like digital switches and pulse coded modulation (PCM) transmission at E1 or T1 rates. TDMA users share the radio spectrum in the time domain. An individual user is allocated a time slot and, during this time slot, the user accesses the whole frequency band allocated to the system (wideband TDMA) or only a part of the band (narrow band TDMA). In TDMA, transmission take place in bursts from a mobile station to a base station in an uplink path with only one user transmitting to the base station at any given time. In the downlink path from the base station to the mobile station, the base station usually transmits continuously with the mobile station listening only during the assigned time slot. TDMA channel multiplexes the bids from a number of users. This type of system requires transmission at a higher bit rate over a radio frequency channel.

Another technology that is becoming more widely used is code-division multiple access (CDMA) in a spread spectrum. Spread spectrum techniques spread the bandwidth of the transmitting signal over a spectrum or band of frequency much larger than the minimal band with required to transmit the signal. CDMA has an ability to lock out conflicting signals, which may allow it to share a system with other radio signals without interference.

Wireless technology is an important component of the global information infrastructure. To exploit the full potential of this technology, regulators and administrators of all countries are re-evaluating their spectrum allocation policy. A large segment of the spectrum around two GHz bandwidth has already been released for the use of wireless networks. More spectrum is being allocated by the International Telecommunications Union (ITU) and countries like the United States of America and Canada around the 7–10 GHz range to use wireless technology for broadband wireless applications. Wireless networks are being built all over the world to handle a large volume of traffic and mobility.

With the increased demand for cellular telephones, manufacturers look for new technologies to overcome the problems of poor signals and battery performance. Poor signals resulted in poor performance for the user and a high frequency of false hand offs in the system. Better battery performance was needed to reduce size and costs of hand held units. The size of handsets and better battery performance led to low power designs and performance targets possible only using fully digital technologies. In particular, digital cellular systems based on the global system for mobile communications (GSM) using TDMA have emerged in Europe while systems based on IS-54 using TDMA and IS-95 using CDMA are being developed in the United States.

With this increase in use of wireless communication systems, security agencies have focused on methods for intercepting calls within the systems. Security agencies in the execution of their duties may be authorized to capture the call content of a targeted subject using telecommunications equipment. A GSM system provides mobile cellular service and is the equipment used by some carriers to provide mobile phone service to their subscribers. When an intended targeted subscriber is using cellular services provided by a GSM system, then the GSM system must have the necessary capability to recognize the target, capture call details and call content, and deliver them to the designated security agencies in real time. This type of capability is called "call interception".

Currently, in some call interception products available in GSM systems, complete activity of the target is not captured. For example, some products are not capable and do not capture handover activity. Additionally, the GSM technology is continuously evolving, providing new capabilities and services to mobile users on a regular basis. With this changing of GSM technology, the presently available call interception products usually have to be extensively modified to capture the new activity and a lag often occurs behind the delivery of the new service.

Therefore, it would be advantageous to have an improved method and apparatus for intercepting calls in a communication system.

SUMMARY OF THE INVENTION

The present invention provides a method and apparatus for intercepting calls within a wireless communications system. In particular, the present invention provides a call intercept component and a number of control points. Each of the control points is associated with a layer or component within the wireless communications system that handles messages associated with a mobile station within the wireless communications system. Each control point monitors messages received at the component or layer associated with the control point. The messages are examined to determine whether the message is appropriate for interception. If the message is appropriate for interception, the message is then sent to the call interception layer. In turn, the call interception layer formats data from the message and routes it to a destination.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
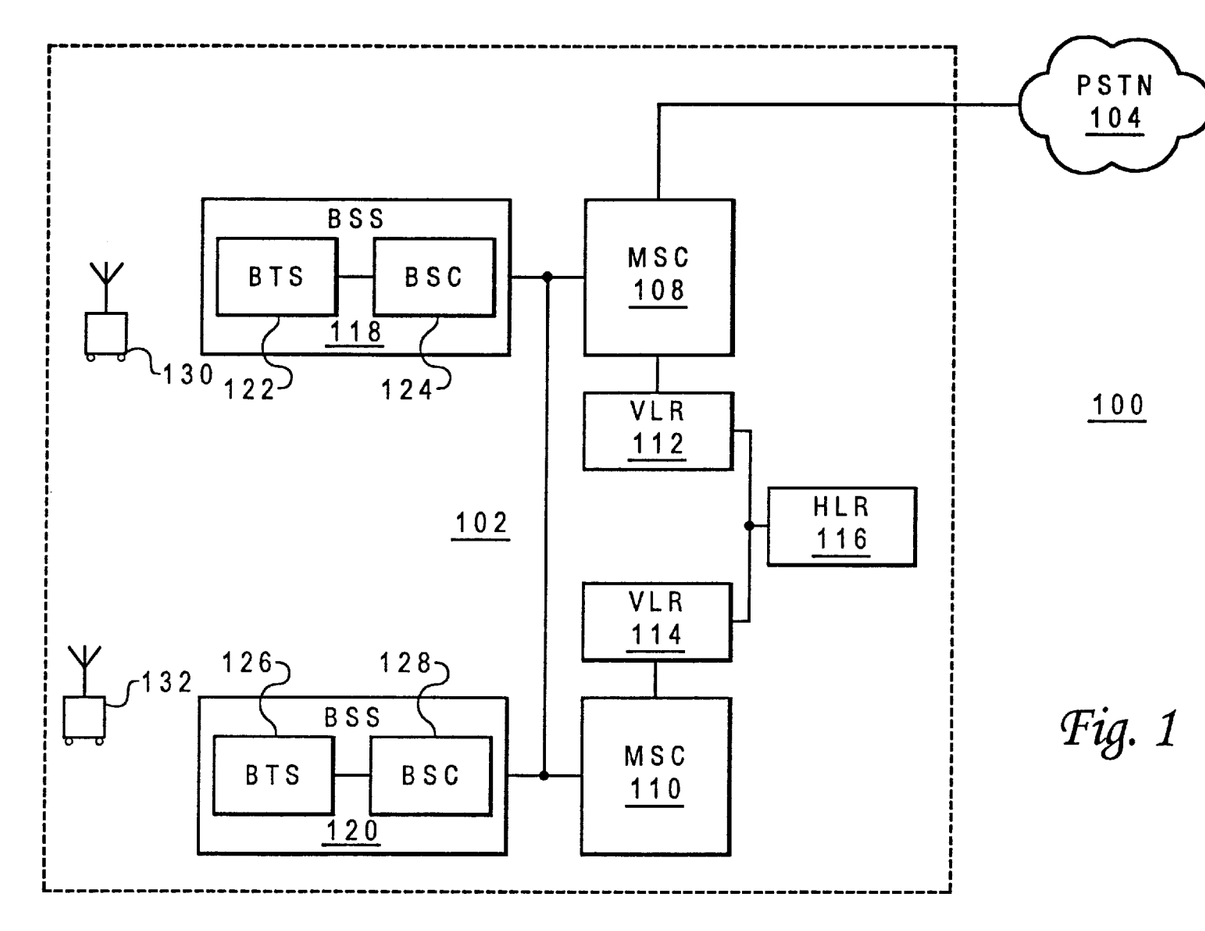
FIG. 1 is a block diagram of a communications system in which the present invention may be implemented.

With reference now to the figures and in particular with reference to FIG. 1, a block diagram of a communications system is illustrated in which the present invention may be implemented. Communications system 100 includes a wireless communications system in the form of cellular system 102. In addition, also depicted in communications system 100 is a public switched telephone network (PSTN) 104. Cellular system 102 is a TDMA wireless communications system in the depicted example. More specifically, cellular system 102 is a GSM system. Cellular system 102 includes a mobile service switching center (MSC) 108 and 110, which have connections to visitor location registers 112 and 114 and home location register 116. Additionally, communications system 102 also includes base station systems (BSS)s 118 and 120. BSS 118 includes a base transceiver station (BTS) 122 and a base station controller (BSC) 124. Similarly, BSS 120 includes a BTS 126 and a BSC 128. Also illustrated in FIG. 1 are communications units in the form of mobile stations 130 and 132. Mobile stations 130 and 132 may be, for example, a handheld cellular phone. MSC 108 is coupled to PSTN 104.

MSC 108 performs switching of a call from PSTN 104 to mobile communications units within wireless communications system 102. MSC 108 and 110 also validates subscriber mobile stations to determine if the subscriber is a resident of the system or a roamer by using visitor location register (VLR) 112, VLR 114, and home location register (HLR) 116. VLR 112 and 114 is a functional unit that dynamically stores subscriber information, such as location area, when the subscriber is located in the area covered by a particular VLR. When a roaming mobile station enters an area controlled by an MSC, the MSC informs the associated VLR about the mobile station and initiates a registration procedure for the mobile station. HLR 116 is a functional unit used for management of mobile subscribers. Subscriber information and the part of the mobile information to allow incoming calls to be routed to the MSC for a particular mobile station are stored within HLR 116. For example, VLR address, mobile station, ISDN number, and subscriber data are information stored within HLR 116. MSC 108 and 110 perform the necessary switching functions from mobile stations located within a geographic area associated with a particular MSC, called an MSC area. The MSCs monitor the mobility of its subscribers and manages necessary resources needed to handle and update location registration procedures and carry out handoff functions.

BSS 118 and 120 are the physical equipment providing radio coverage to a defined geographical areas called cells. BSS 118 and 120 contain the hardware necessary to communicate with mobile stations 130 and 132. BSC 124 and BSC 128 and BSS 118 and 120, respectively perform a control function while BTS 122 and BTS 126 perform the transmitting function. The BTSs are the radio transmission equipment and are employed to cover each cell. A BSS can cover several cells using multiple BTSs. BTS 122 and BTS 126 each contain a transcoder rate adopter unit (TRAU) (not shown), which provides GSM's specific speech and coding and decoding processes as well as rate adaptation functions for data. Although the depicted example is a GSM system, the present invention may be implemented in other types of wireless communications system, such as, for example, a wireless system under IS-95 or Japanese Digital Cellular Standards.

Figure 2:
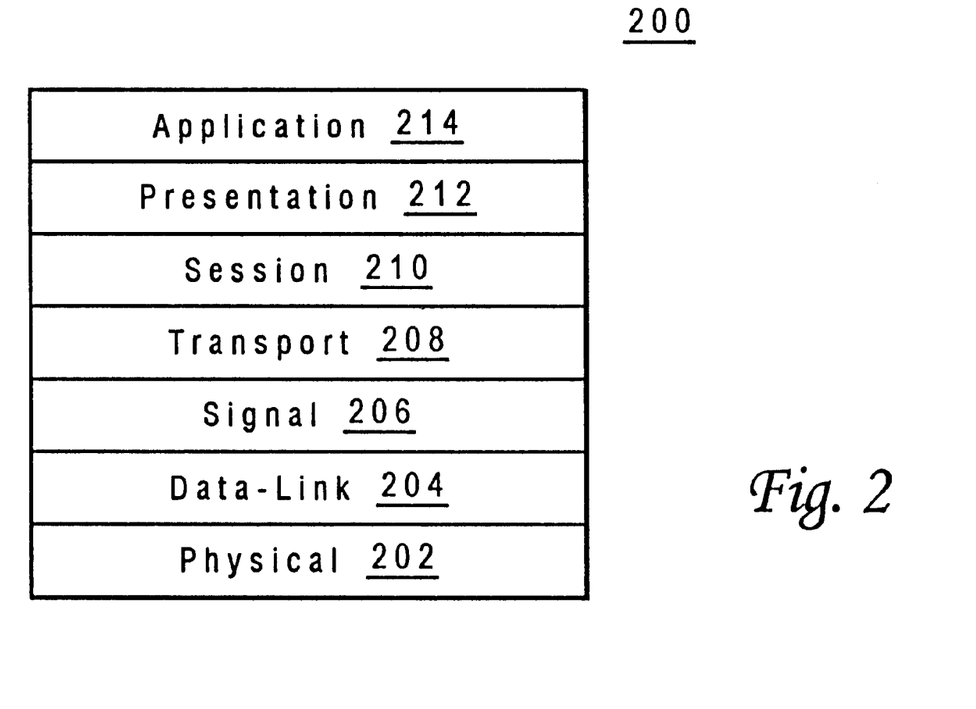
FIG. 2 is a diagram of an open systems interconnection (OSI) model in which the present invention may be implemented.

Turning next to FIG. 2, a diagram of an open systems interconnection (OSI) model is depicted in which the present invention may be implemented. OSI model 200 illustrates a layer architecture with several levels of services for interaction between components in a communications system. The lowest three layers physical layer 202, data link 204 and signal layer 206 (also called a "network layer") deal with hardware links within the communications system. Physical layer 202 addresses hardware connections while data link layer 204 encompasses coding, addressing, and transmitting of information. Signal layer 206, also called a "network layer", is the layer in which the transportation routes, message handling, and message transfer are handled. It is in this layer in which the present invention is implemented in the depicted example. Above signal layer 206 is transport layer 208, which handles accurate delivery and service quality. Session layer 210 is involved in establishing, maintaining, and coordinating communications. Presentation layer 212 involves formatting and presentation while application layer 214 encompasses program-to-program transfer of information. Signal layer 206 in an OSI model ensures that information arrives at its intended designation. Signal layer 206 is employed to establish, maintain, and keep open a path for information to travel on and make the actual route immaterial to any other layer within model 200. In particular, in the depicted example, signaling layer 206 provides the functions to establish, maintain, and terminate circuit-switched connections across a GSM public land mobile (PLM) network and to other networks to which the GSM communications system is connected. Signaling layer 206 provides necessary supporting functions related to call control, supplementary services control, and short messages service control. Furthermore, this signaling layer also includes the functions necessary for mobility management and radio resource management. These functions are contained within an MSC, such as MSC 108 or MSC 110 in FIG. 1.

Figure 3:
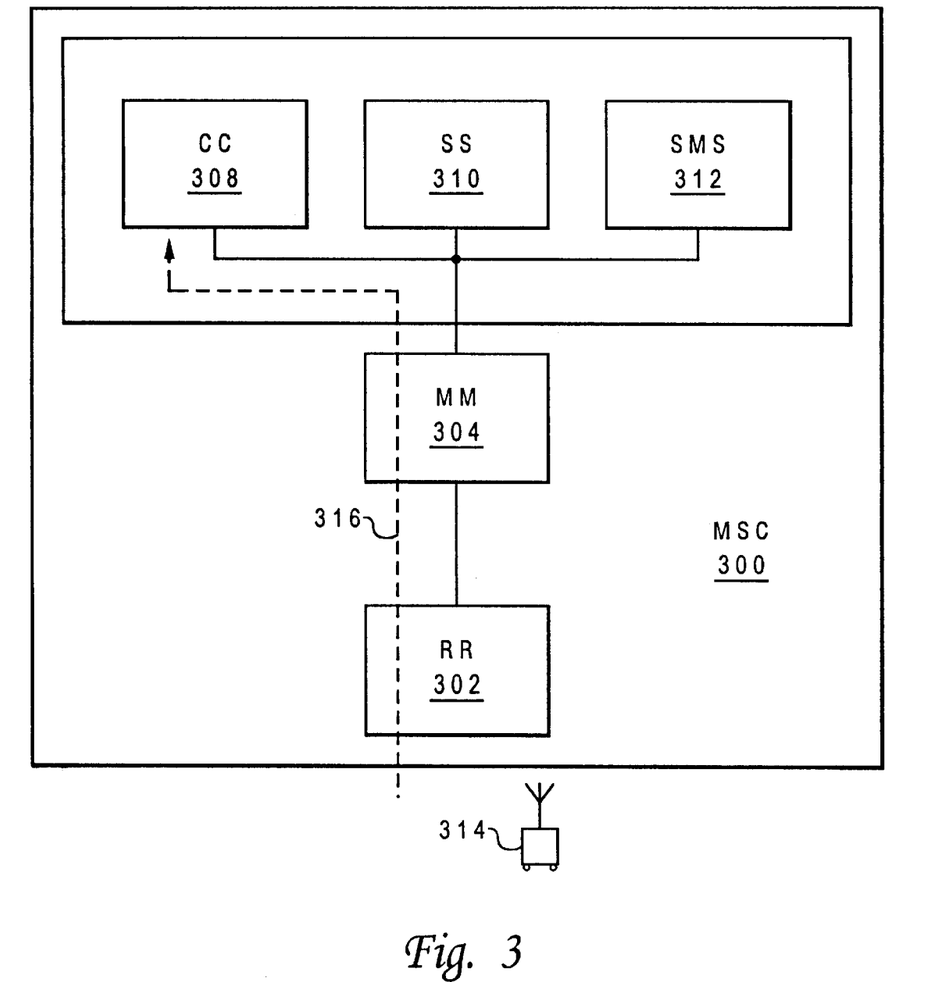
FIG. 3 is a block diagram of layers within a mobile service switching center (MSC) in which the present invention may be implemented.

With reference now to FIG. 3, a block diagram of layers within a mobile service switching center (MSC) is illustrated in which the present invention may be implemented. MSC 300 includes a radio resource management (RR) layer 302, a mobility management (MM) layer 304, and a connection management (CM) layer 306. Connection management layer 306 includes a call control (CC) layer 308, a call independent supplementary services support (SS) layer 310, and a short message service support (SMS) layer 312. RR layer 302 provides for the establishment, operation, and release of a dedicated channel connection for a mobile station. MM layer 304 is employed for location updating and authenticating functions. CC layer 308 provides for establishment, maintaining, and termination of circuit-switched calls. The functions of these layers within MSC 300 are performed by signaling layer protocols between two systems in which one of the systems is the mobile station and the other system is the network side of the interface with the MSC being the network side. These layers are layers within a signaling layer, such as signaling layer 206 in FIG. 2. A mobile station such as mobile station 314 communicates with MSC 300 through the signaling layer. Exchange of information between these two layers is performed by the various units depicted within MSC 300 in FIG. 3.

When mobile station 314 requests a service, such as making a call, then intelligent messages are sent from mobile station 314 to MSC 300. Each message flows through the signaling layer where it ultimately reaches the layer where the service will be processed. For example, when a user at mobile station 314 makes an outgoing call, the user dials a number and presses a send button. Messaging is sent from mobile station 314 to MSC 300. The message containing the dialed number is called the SETUP message. This message travels through MSC 300 along path 316, which travels through radio resource unit 302, mobility management unit 304, and call connection unit 308. Other messages (not shown) have been sent prior to the SETUP message to establish and authenticate the call. For purposes of illustration, however, only the SETUP message is depicted in FIG. 3. This set up message flows through the signaling layer through path 316 until it ultimately reaches call control 308, which is used to establish a circuit switched call with mobile station 314. Other messages may travel through other paths to other layers such as SS unit 310 and SMS unit 312.

Figure 4:
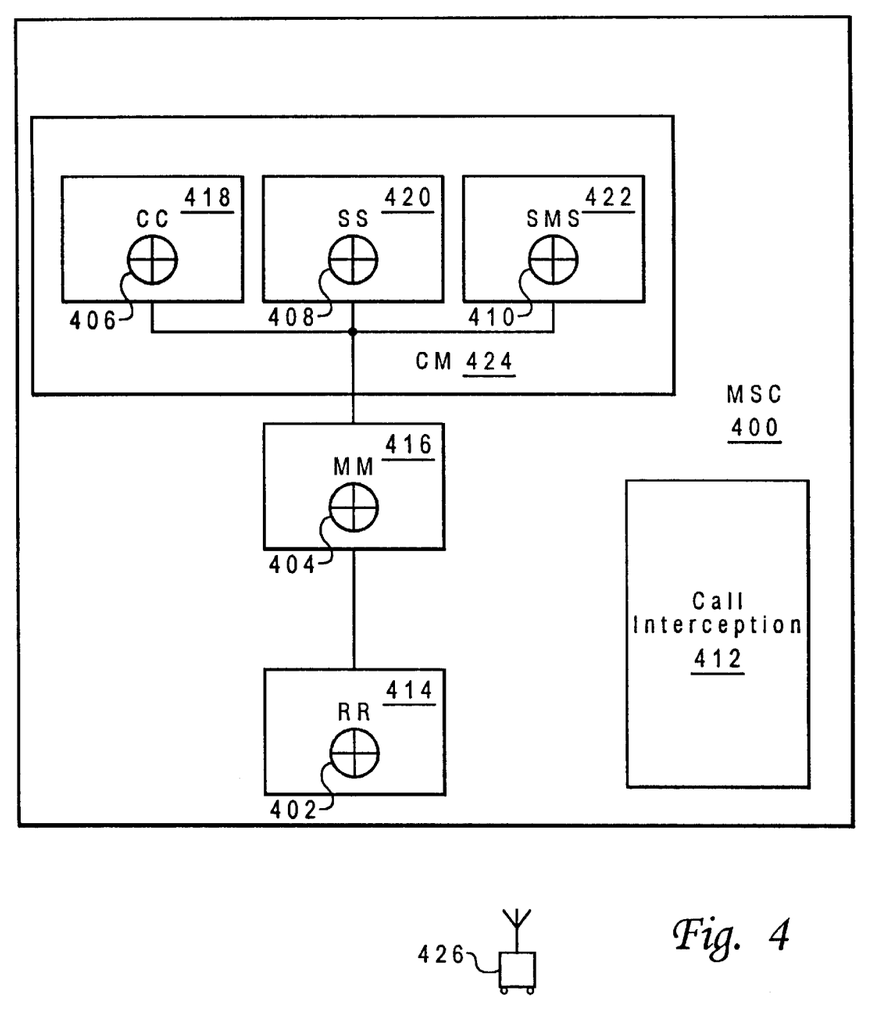
FIG. 4 is a block diagram of an MSC containing interception control points and a call interception unit according to the present invention.

For call interception processing, the present invention employs call interception control points. Turning now to FIG. 4, a block diagram of an MSC containing interception control points and a call interception unit is depicted according to the present invention. In particular, MSC 400 contains call interception control points 402–410 and a call interception unit 412. Control point 402 is contained within RR layer 414 while control point 404 is contained within MM layer 416. CC layer 418 includes control point 406, SS layer 420 contains control point 408 and SMS layer 422 contains control point 410. Through this architecture, the present invention provides a call interception capability in MSC 400 that takes advantage of the layered nature of the signaling layer. In particular, when a target mobile station, such as mobile station 424 is targeted as an intercept subject, MSC 400 activates a control operation and activates call intercept layer 412. Additionally, MSC 400 activates call intercept control points 402 through 410 in each of the GSM layers. The control points and the call intercept layer are collectively referred to as the call intercept system (CIS).

The CIS is a controlling entity for monitoring all activity and data associated with a targeted user's mobile station. All activities associated with a mobile station generates either incoming or outgoing messages. When control points are active, all messaging which is processed or generated at a layer within the MSC is sent to call intercept layer 412 for capture. Call intercept layer 412 inspects all messaging to and from the target mobile station and captures all information (messaging and other data) and activity associated with the target mobile station. Call intercept layer 412 collects call associated and non-call associated information and distributes it to a destination, such as a connecting monitoring center. Additionally, call intercept layer 412 also delivers any bearer channel content (voice, data, facsimile) captured, providing channel establishment, connection management and channel takedown. Since all activity from a mobile station, such as mobile station 424, flows through the various layers making up the signaling layer in MSC 400, the activity can be easily captured and delivered to a monitoring center located remotely from the communications system. As a result, activities that could not previously be handled by presently available systems, such as handover, are easily captured using the architecture according to the present invention. When call interception is deactivated for a subject or target mobile station, the control points 402–410 and call interception layer 412 are deactivated.

Figure 5:
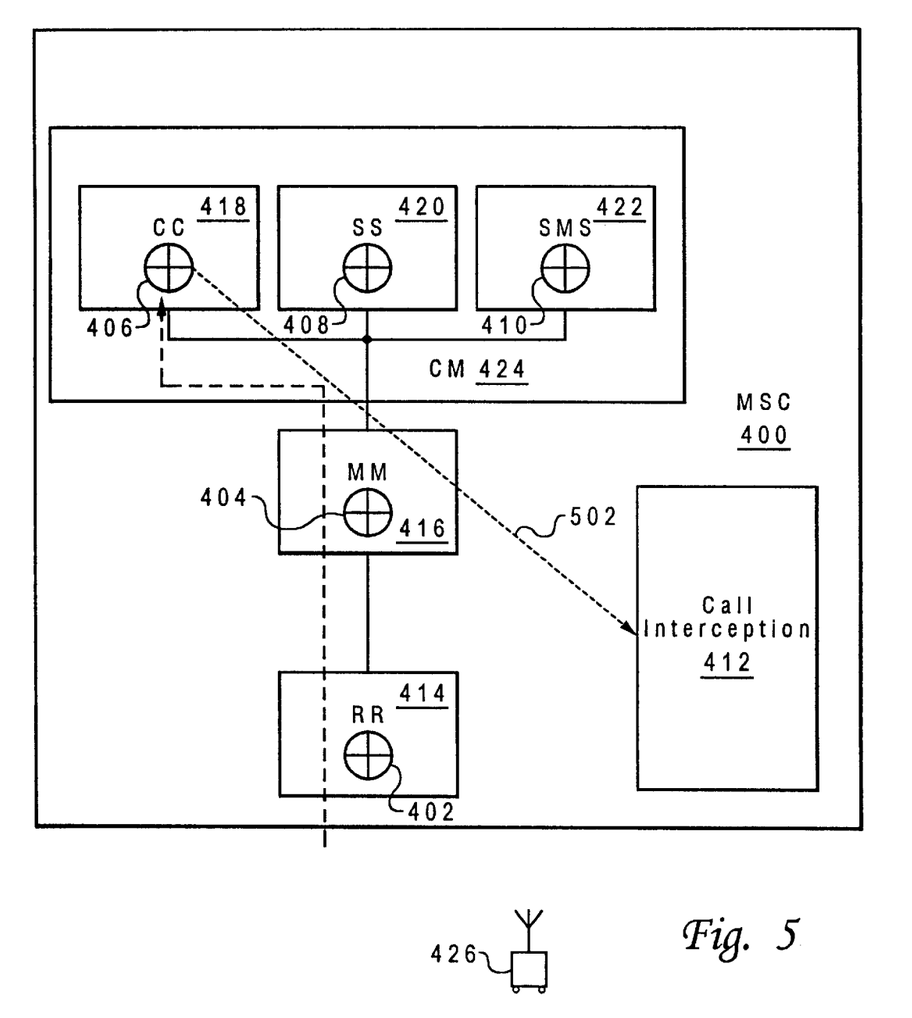
FIG. 5 is a block diagram illustrating information flow and capture of a call according to the present invention.

Turning now to FIG. 5, a block diagram illustrating information flow and capture of a call is depicted according to the present invention. In FIG. 5, as well as elsewhere, items with the same reference numerals are referring to the same items as in other figures. MSC 400 has received a set up message along path 500. The set up message flows through radio resource layer 414 to mobility management layer 416. From there, the set up message travels to call control layer 418 within connection management layer 424. Control point 406 within call control layer 418 sends the set up message to call interception layer 412 through path 502. From that point, call interception layer 412 captures information within the set up message and delivers the needed data to a monitoring center. Additionally, call interception layer 412 establishes the connection to the monitoring center to deliver the bearer channel information when available.

Figure 6:
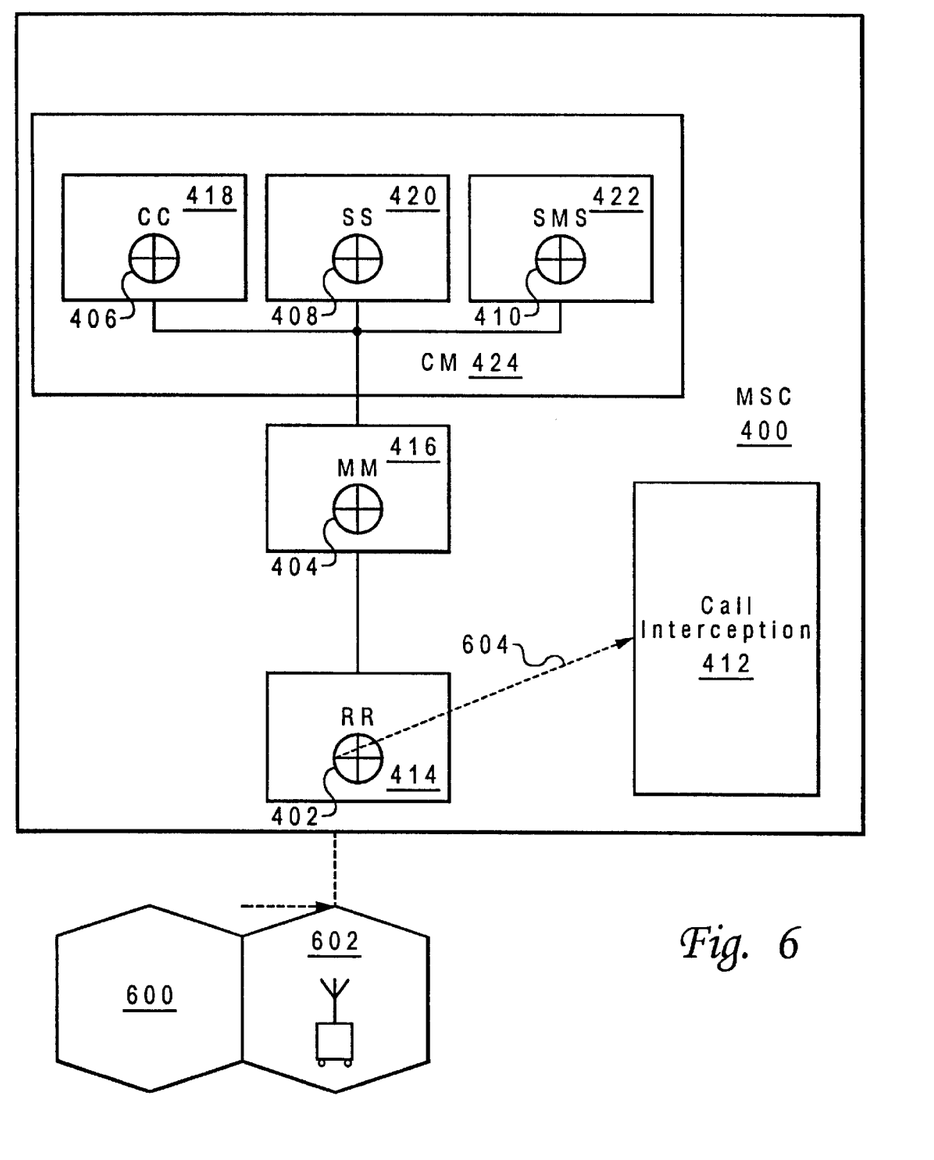
FIG. 6 is a block diagram illustrating information flow and capture of a call in a handover situation according to the present invention.

With reference now to FIG. 6, a block diagram illustrating information flow and capture of a call in a handover situation is depicted according to the present invention. When mobile station 426 travels from cell 600 to cell 602, a handover occurs in which a handover message is transmitted from mobile station 426 to MSC 400. This handover message is received by radio resource layer 414 in which control point 402 sends the handover message to call interception layer 412 through path 604. This flexibility is made possible by the control points distributed within the various layers in MSC 400.

Additionally, the call interception system may be employed to not only capture information from calls made to and from the subject mobile station, but it also may be employed to facilitate the capture of information on calls forwarded by the mobile station. The telecommunications supplementary service of call forwarding allows a subscriber to direct its calls to other designations. Several types of call forwarding is present in GSM systems which are differentiated on conditions on when to establish the call forwarding. For example, a subscriber may want to forward all calls unconditionally or the subscriber may want to forward calls only when the subscriber is busy on another call.

Figure 7:
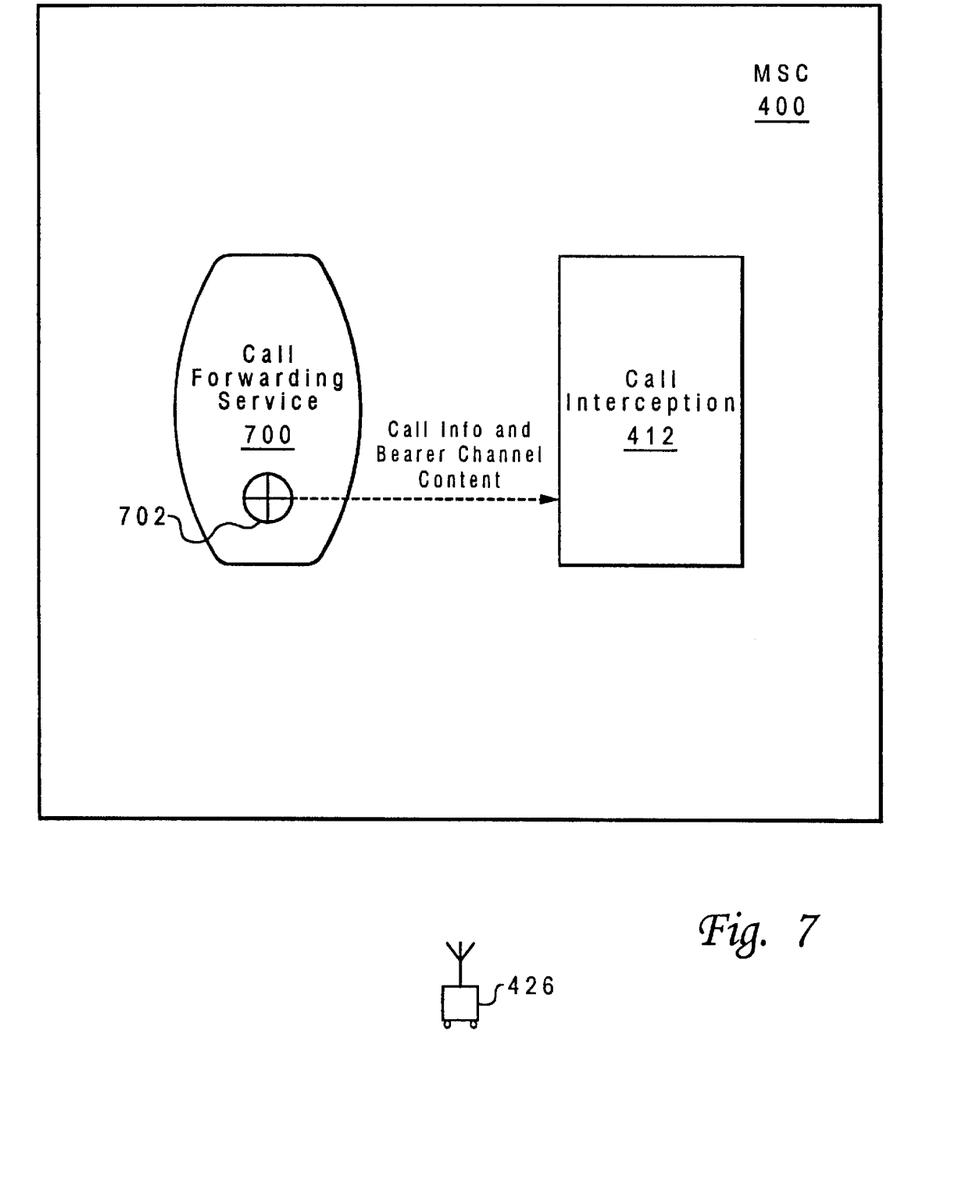
FIG. 7 is a block diagram illustrating information flow and capture of a forwarding call according to the present invention.

In any event, security agencies desire to monitor the call which was intended for the subject, but was forwarded. During a forwarded call, the subject is not making or receiving a call from a mobile station, so no signaling layer communication occurs within the MSC. The call intercept system is established from within the call forwarding service. With reference to FIG. 7, a block diagram illustrating information flow and capture of a forwarding call is depicted according to the present invention. In MSC 400, a call forwarding service 700 is present in which a control point 702 is present for detecting and sending information and bearer channel content to call interception layer 412. In turn, call interception layer 412 sends the data and bearer channel content to a monitoring center. In this example, targeted mobile station 426 is not actively involved in a call, but forwarding calls are being monitored. In this case, a gateway MSC directs incoming calls to MSC 400 where mobile station 426 is located or forwards calls if mobile station 426 is unconditionally forwarded as described above. In this example, mobile subscriber 426 about to be forwarded is an identified targeted subject for call capture. In this case, control point 702 and call forwarding service 700 is activated. As with a basic call, call interception layer 412 monitors all activity on the forwarded call, collects information, builds and sends the data records to the monitoring center. Additionally, call interception layer 412 establishes connections for the call content delivery to the monitoring center. Call forwarding service 702 is in a distinctly different real time system from the signaling layer components illustrated in FIGS. 3–6. The control points and control intercept layer may function from either system according to the present invention.

Figure 8:
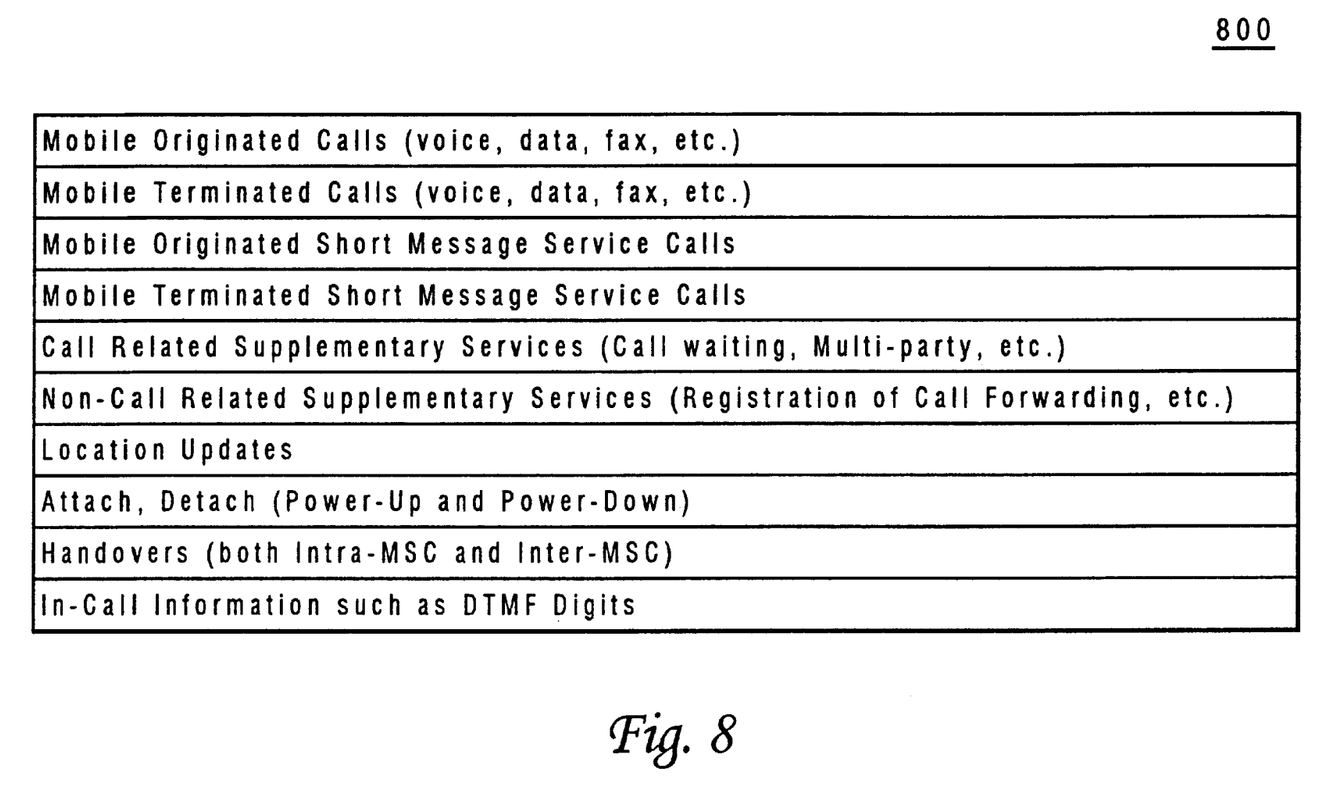
FIG. 8 is a table of activities that may be captured according to the present invention.

Turning now to FIG. 8, a table of activities that may be captured are depicted according to the present invention. For example, voice, facsimile, and other data may be captured in both mobile originated and mobile terminated calls. Originated and terminated short message service calls also may be captured by the present invention. Supplementary services related to calls, such as call waiting, and multi-party may be captured as well as non call related supplementary services, such as call forwarding registration. Additionally, updates on the location of the mobile system may be captured along with indications of when a mobile system has powered up or powered down. Handovers and in-call information also maybe captured as can be seen from Table 800.

Figure 9:
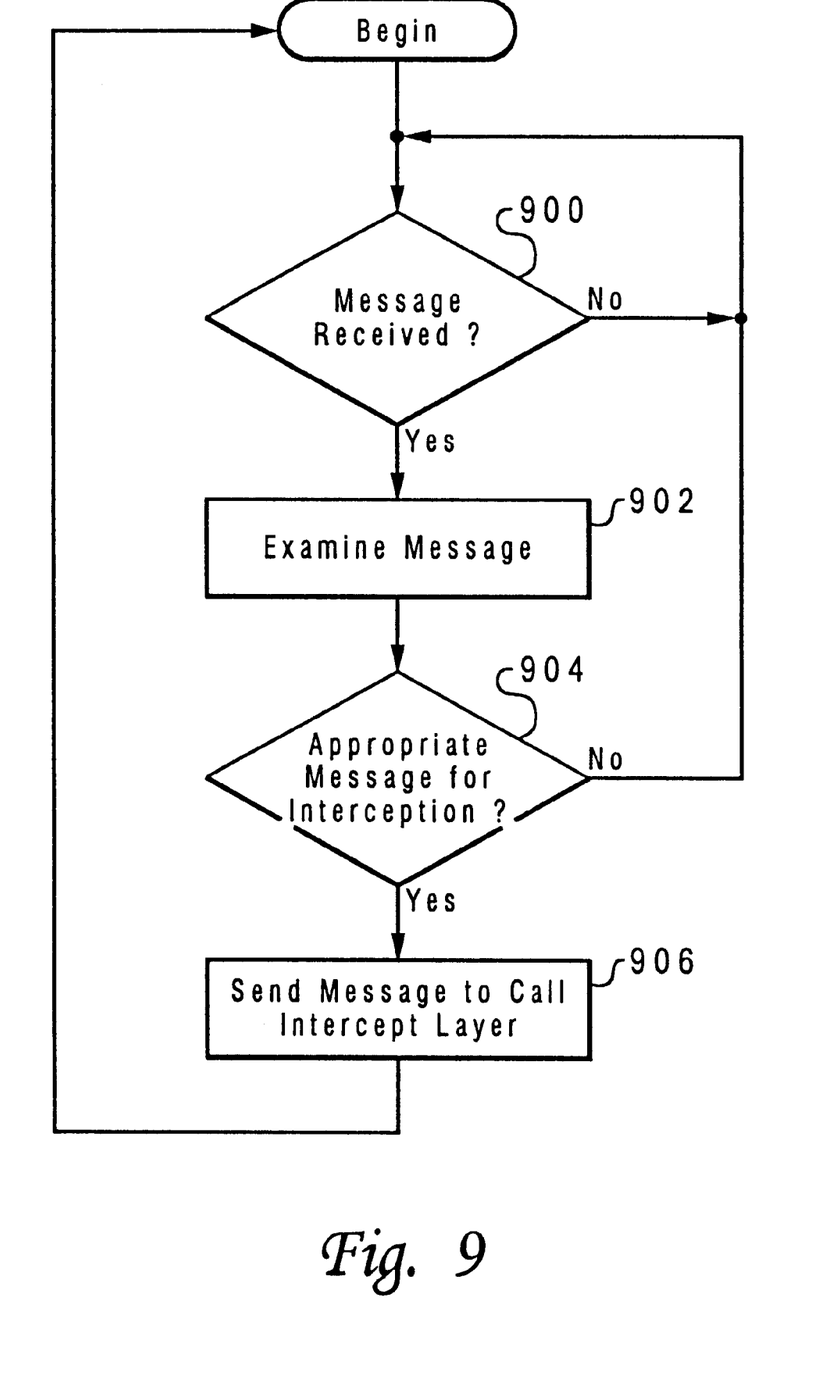
FIG. 9 is a high level flowchart of a process employed in a control point according to the present invention.

Turning now to FIG. 9, a high level flowchart of a process employed in a control point is depicted according to the present invention This process is followed when a control point has been activated. The process begins by determining whether a message has been received (step 900). If a message has not been received, the process returns to step 900. Upon the reception of a message at a control point, the process then examines the message (step 902). A determination is then made as to whether the message is an appropriate message for interception (step 904). If the is message is not an appropriate message for interception, the process returns to step 900. Otherwise, the message is then sent to the call intercept layer (step 906).

Figure 10:
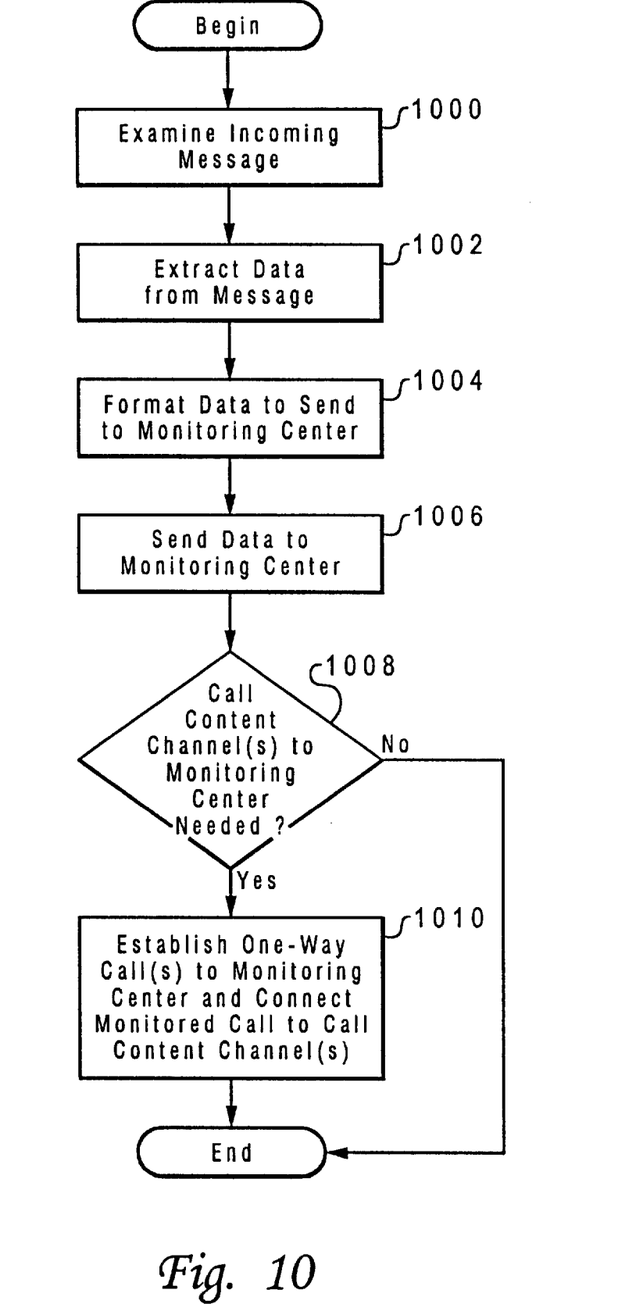
FIG. 10 is a high level flowchart of a process employed in a call intercept layer according to the present invention.

Turning now to FIG. 10, a high level flowchart of a process employed in a call intercept layer is depicted according to the present invention. The process begins by examining an incoming message from a control point (step 1000). hereafter, data is extracted from the message (step 1002), and the data is formatted to be sent to the monitoring center (step 1004). The format of the data is entirely dependent on the requirements of a particular agency or entity requesting the intercepted data and may differ from agency to agency or from country to country. Thereafter, the data is sent to the monitoring center (step 1006) and a determination is made as to whether call content channels are to be sent to the monitoring center (step 1008). If the call content channel or channels are to be set up, then a one-way call is established to the monitoring center and the monitored call is connected to the call content channels (step 1010) with the process terminating thereafter. A one way call setup is employed for call content channels to eliminate the possibility that targeted subscriber will know that it is being monitored. With reference again to step 1008, if the content channels are not required, the process then terminates.

Thus, the present invention provides an improved method and apparatus for call interception based on the use of control points and a call interception layer. This advantage is provided by the use of controlled points, which may be placed in various functional layers or components of a wireless communications system. For example, in the signaling layer in an MSC, controlled points may be placed within the various layers to intercept calls depending on the messages sent to the MSC. Additionally, a control point also may be placed within other layers or portions of a wireless communications system within an OSI model. For example, the present invention provides for the use of control points within a call forwarding service in which data is transmitted to the call intercept layer. By providing control points then the various functional layers in the wireless communications system with a separate control interception processing layer, the present invention provides reducing the amount of code or software that must be added in the event that new capabilities or features are provided for a wireless communications system. Additionally, the call interception system of the present invention allows for capture of activities from new capabilities or features by the use of control points that may be introduced into layers providing the new capabilities or features.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for intercepting calls in a communications system, the method comprising:

providing a plurality of control points, wherein each control point within the plurality of control points is associated with a different layer within a plurality of layers for handling messages associated with a call and selected from the group consisting of a radio resource management layer, a mobility management layer, a connection management layer, a call control layer, a call independent supplementary services support layer, and a short message service support layer, wherein each control point monitors messages received by a layer associated with the control point, identifies messages relating to a target call within the associated layer, and sends the message to a call interception layer; and routing messages associated with target calls which are received in the call interception layer to a call-intercept destination.

2. The method of claim 1, wherein the plurality of layers are sublayers in a signal layer.

3. The method of claim 1, wherein the step of providing a plurality of control points includes providing a control point in a layer for handling a call forwarding service within the communications system.

4. The method of claim 3 further comprising routing call data associated with the target call to the destination.

5. The method of claim 4, wherein the step of routing call data associated with the target call to the destination comprises establishing a connection to the destination and sending call data to the destination over the connection.

6. The method of claim 5, wherein the step of establishing a connection to the destination comprises establishing a one way call to the destination.

7. The method of claim 5, wherein the call data is voice data.

8. The method of claim 5, wherein the call data is a facsimile transmission.

9. A wireless communications system comprising:

a base station system, wherein the base station system and sends messages to and from a mobile station; and a mobile switching center connected to the base station system, the mobile switching center including:
  a plurality of layers for handling messages associated with a call associated with the mobile station, wherein the plurality of layers are selected from the group consisting of a radio resource management layer, a mobility management layer, a connection management layer, a call control layer, a call independent supplementary services support layer, and a short message service support layer;
  a call interception layer, wherein the call interception layer routes data associated with a target mobile station to a call-intercept destination; and
  a plurality of control points, wherein each control point within the plurality of control points is associated with a different layer within the plurality of layers and wherein each control point monitors messages within the associated layer to identify messages relating to a target mobile station and sends data associated with communications to the target mobile station to the call intercept layer in response to detecting messages relating to the target mobile station.

10. The wireless communications system of claim 9, wherein the plurality of layers are located within the mobile switching center.

11. The wireless communications system of claim 9, wherein the call interception layer is located within the mobile switching center.

12. The wireless communications system of claim 11, wherein the plurality of control points are located within the plurality of layers.

13. The wireless communications system of claim 9, wherein the data associated with communications to the target mobile station is voice data.

14. The wireless communications system of claim 9, wherein the data associated with communications to the target mobile station is a facsimile transmission.

15. The wireless communications system of claim 9, wherein the data associated with communications to the target mobile station is a message.

16. The wireless communications system of claim 15, wherein the message is a setup message including a number dialed at the target mobile station.

17. The wireless communications system of claim 15, wherein the message is an outgoing message to the target mobile station.

18. The wireless communications system of claim 15, wherein the message is an incoming message from the target mobile station.

19. The wireless communications system of claim 9, wherein the plurality of layers includes a layer for handling call forwarding services.

20. The wireless communications system of claim 19, wherein the data associated with communications to the target mobile station is data associated with a forwarded call.

21. The wireless communications system of claim 9, wherein the call interception layer establishes a connection to the destination and sends the data to the destination over the connection.

22. The wireless communications system of claim 21, wherein the connection is a one way call to the destination.

23. The wireless communications system of claim 9, wherein the wireless communications system is a global system for wireless mobile communications public land mobile network.

24. The wireless communications system of claim 9, wherein the wireless communications system is a time-division multiple access based wireless communications system.

25. The wireless communications system of claim 9, wherein the wireless communications system is a code-division multiple access based wireless communications system.

26. A mobile service center for intercepting calls comprising:
  a plurality of layers that receive messages associated with calls;
  a call intercept layer, wherein the call intercept layer routes data from messages associated with target calls to a call-intercept designation; and
  a plurality of control units, wherein each control unit within the plurality of control units is associated with a different layer within a plurality of layers selected from the group consisting of a radio resource management layer, a mobility management layer, a connection management layer, a call control layer, a call independent supplementary services support layer, and a short message service support layer, each control unit monitoring messages received at an associated layer to determine whether a received message should be intercepted and sending the received message to the call intercept layer in response to a determination that the received message should be intercepted.

27. The mobile switching center of claim 26, wherein the received message is a setup message.

28. The mobile switching center of claim 26, wherein the received message is an incoming message from a mobile station.

29. The mobile switching center of claim 26, wherein the received message is an outgoing message.

30. A wireless communications system comprising:
  a base station system, wherein the base station system receives and sends communication signals to and from at least one mobile station; and
  a mobile service center coupled to the base station system and including:
    a plurality of message handling units selected from the group consisting of a radio resource management unit, a mobility management unit, a connection management unit, a call control unit, a call independent supplementary services support unit, and a short message service support unit, wherein each of the plurality of message handling units handles messages associated with calls; and
  a plurality of control points, each control point being associated with a different message handling unit within the plurality of message handling units, each control point having an active state and an inactive state in which the active state has a plurality of modes of operation including:
    a first mode of operation in which the control point waits for a message to arrive at an associated message handling unit;
    a second mode of operation, responsive to arrival of a message in the first mode of operation, in which the control point examines the message arriving at the associated message handling unit to determine whether the message is appropriate for interception; and
    a third mode of operation in which the message is sent to a call intercept unit in response to a determination that the message is appropriate for interception in the second mode of operation,
  wherein the call intercept unit sends data received from the plurality of control points to a call-intercept destination.

31. The wireless communications system of claim 30, wherein the wireless communications system is a global system for wireless mobile communications public land mobile network.

32. The wireless communications system of claim 30, wherein the wireless communications system is a time-division multiple access based wireless communications system.

33. The wireless communications system of claim 30, wherein the wireless communications system is a code-division multiple access based wireless communications system.

34. The wireless communication system of claim 30, wherein the control point sends data associated with the message to the call intercept unit.

35. The wireless communications system of claim 34, wherein the data associated with the message is voice data from a target mobile station.

36. The wireless communications system of claim 34, wherein the data associated with the message is a facsimile transmission.

37. The wireless communications system of claim 34, wherein the call intercept unit has a plurality of modes of operation including:
   a first mode of operation in which the call intercept unit formats data received from a control point to form formatted data;
   a second mode of operation in which the call intercept unit establishes a connection to the destination;
   a third mode of operation in which the call intercept unit sends the formatted data to the destination.

38. The wireless communication system of claim 34, wherein the connection is a one way call to the destination.

39. A wireless communications system comprising:
   a plurality of layers for handling messages associated with a call involving a mobile station;
   call interception means for formatting data from target calls and routing the formatted data to a designation; and
   a plurality of control means, wherein each of the plurality of control means monitors messages handled by one of the plurality of layers, identifies target calls, and sends data from target calls to the call interception means.

40. The wireless communications system of claim 39, wherein the plurality of layers are sublayers within a signal layer in the wireless communications system.

41. The wireless communications system of claim 39, wherein the plurality of layers includes a layer for handling call forwarding services.

42. The wireless communications system of claim 41, wherein the data is data associated with a forwarded call associated with a target mobile user within the wireless communications system.

43. The wireless communications system of claim 39, wherein the plurality of layers includes a radio resource management layer.

44. The wireless communications system of claim 39, wherein the plurality of layers includes a call control layer.

45. The wireless communications system of claim 39, wherein the plurality of layers includes a supplementary service support layer.

46. The wireless communications system of claim 39, wherein the plurality of layers includes a short message service support layer.

47. The wireless communications system of claim 39, wherein the plurality of layers includes a mobility management layer.

48. The wireless communications system of claim 39, wherein the wireless communications system is a global system for wireless mobile communications public land mobile network.

49. The wireless communications system of claim 39, wherein the wireless communications system is a time-division multiple access based wireless communications system.

50. The wireless communications system of claim 39, wherein the wireless communications system is a code-division multiple access based wireless communications system.

51. The wireless communications system of claim 39, wherein each of the plurality of control means is located within an associated layer within the plurality of layers.

52. The wireless communications system of claim 39, wherein the target call is a forwarded call associated with a selected subscriber.

53. The wireless communications system of claim 39, wherein, the data is voice data.

54. The wireless communications system of claim 39, wherein the data is a facsimile transmission.

* * * * *